United States Patent

Jantzen et al.

[11] Patent Number: 5,560,526
[45] Date of Patent: Oct. 1, 1996

[54] CYCLE RACK AND BIKE RACK

[76] Inventors: Jerry E. Jantzen, 13017 N. Ryan Way, Fountain Hills, Ariz. 85268; Patricia L. Jantzen, 22282 Platino, Mission Viejo, Calif. 92691

[21] Appl. No.: 339,035

[22] Filed: Mar. 6, 1995

[51] Int. Cl.$^6$ ..................................................... B60R 9/10
[52] U.S. Cl. .......................... 224/571; 224/924; 224/537; 224/324; 211/19; 211/20; 211/23
[58] Field of Search ................................ 224/537, 924, 224/309, 324, 571, 567, 545; 211/5, 16, 17, 18, 19, 20, 23, 24

[56] References Cited

U.S. PATENT DOCUMENTS

| | | | |
|---|---|---|---|
| D. 328,585 | 8/1992 | La Casse | D12/158 |
| 639,629 | 11/1899 | Butcher | 211/19 |
| 4,015,718 | 4/1977 | Bernard | 211/20 |
| 4,629,104 | 12/1986 | Jacquet | 211/20 |
| 4,823,997 | 4/1989 | Krieger | 224/924 |
| 5,169,042 | 12/1992 | Ching | |
| 5,215,233 | 6/1993 | Baldeck | |
| 5,219,105 | 6/1993 | Kravitz | |
| 5,228,606 | 7/1993 | Hickson | |
| 5,292,009 | 3/1994 | Smith | 211/20 |

FOREIGN PATENT DOCUMENTS 558041  12/1943  United Kingdom ...................... 211/20

*Primary Examiner*—Henry J. Recla
*Assistant Examiner*—Gregory M. Vidovich
*Attorney, Agent, or Firm*—David L. Baker; Rhodes & Ascolillo

[57] ABSTRACT

A channel adapted to receive the wheel of a bicycle or motor cycle. The walls are inclined toward the base of the channel to provide a firm grip on wheels of varying sizes. The walls of the channel contain in one case holes in an alternative embodiment slots which are connected by a pin or bar that secures the wheel in the channel. The pin and bar contain holes that will accept a lock and prevent its removal. A series of channels may be mounted on a plate or other structure to allow for the secure storage of a number of cycles simultaneously.

6 Claims, 5 Drawing Sheets

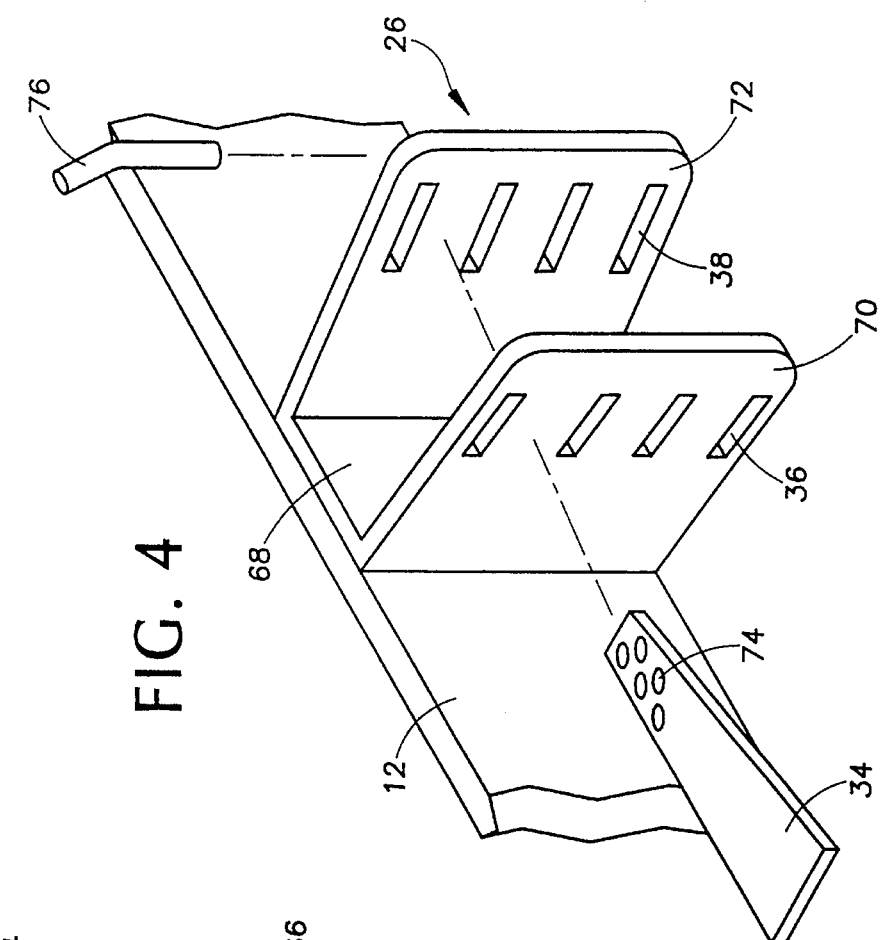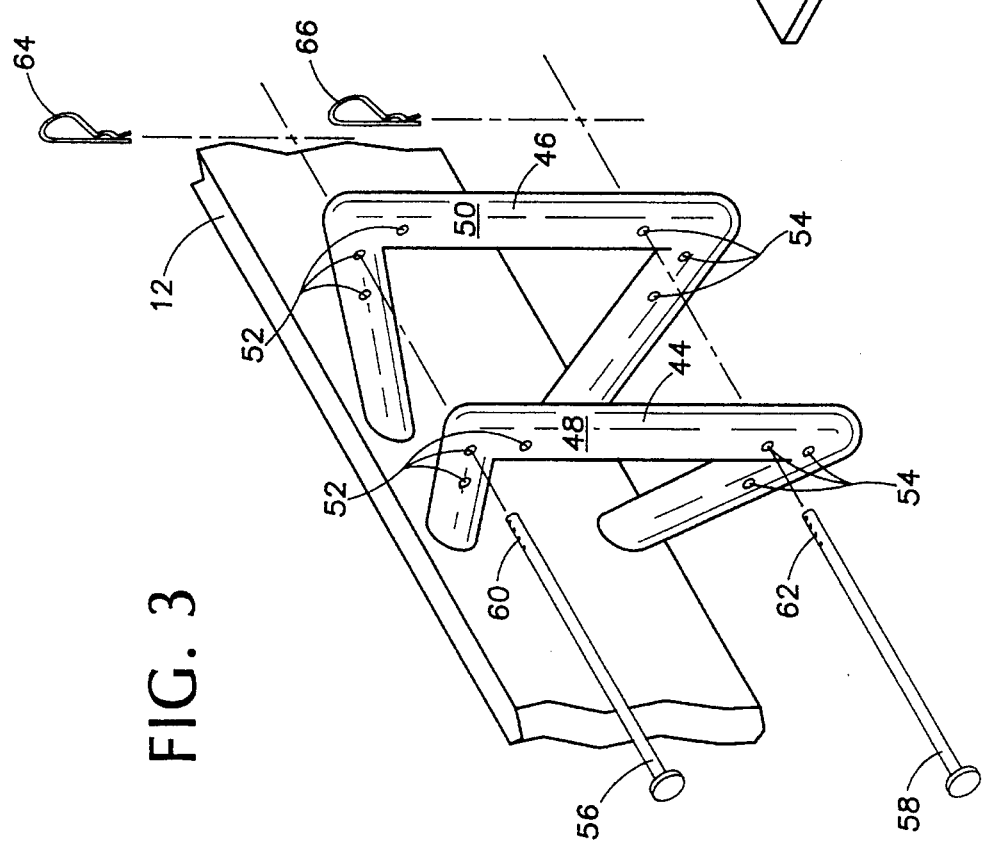

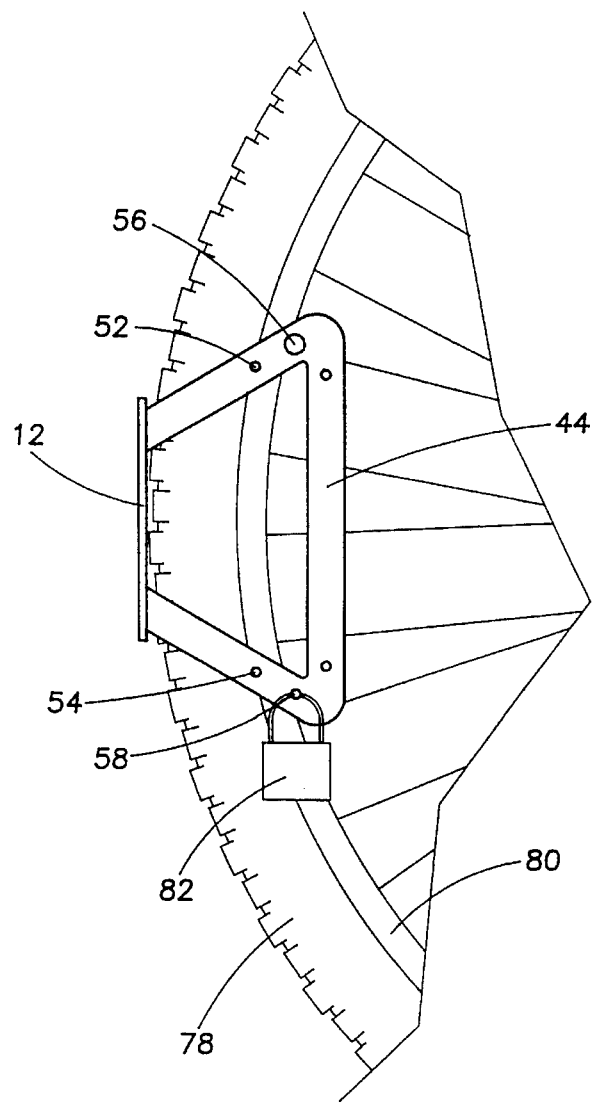
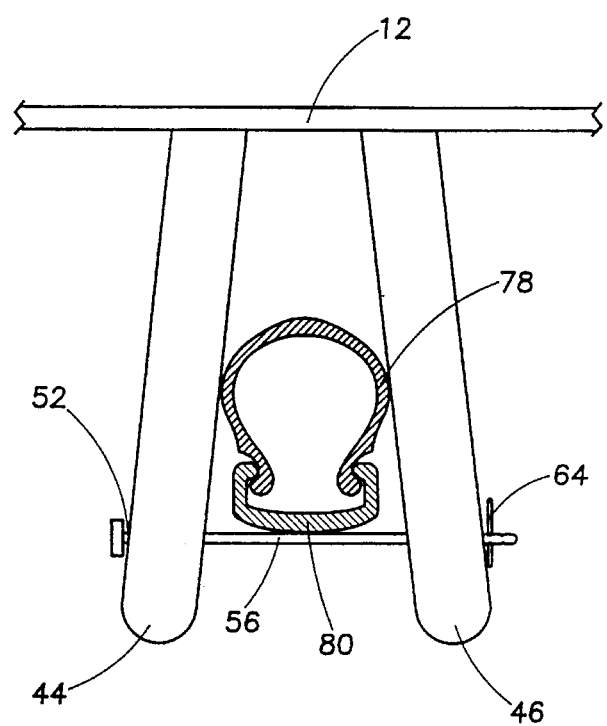

CYCLE RACK AND BIKE RACK

BACKGROUND OF THE INVENTION

1. Field of the Invention

This invention relates generally to devices for two wheeled vehicles commonly referred to as cycles, and in particular to a device for locking the wheels of cycle type vehicles for storage and maintenance.

2. Description of the Prior Art

There are a variety of bicycle racks currently on the market which require that the front wheel be removed in order to secure the bicycle to the rack. One of the disadvantages associated with removing the wheel is where to store it when it is removed and the bothersome task of removing and reinstalling the wheel particularly after a long ride. The invention provides means for securing particularly the front wheel of a motorcycle or bicycle for transportation storage and maintenance. The invention will work equally as well on the rear wheel of the cycle if appropriately positioned. The invention works independently or in cooperation with a bike stand or rack.

Due to the age of the bicycle related art there is a substantial accumulation of information relating to bicycle racks. A brief review of that art, none of which anticipates the claimed invention, is seen in U.S. Pat. No. 5,169,042 issued Dec. 8, 1992 to Ching who shows a bicycle rack that is adapted to attach to the rear of a motor vehicle. U.S. Design Patent No. Des. 328,585 issued Aug. 11, 1992 to La Casse for a vehicle mounted bicycle rack. U.S. Pat. No. 5,215,233 issued Jun. 1, 1993 to Baldeck who discloses a bicycle carrier for vehicles that involves the use of straps for strapping the wheel to the front or rear bumper and another strap arrangement for holding the bicycle frame on the vehicle. Another vehicle mounted carrier is shown in U.S. Pat. No. 5,219,105 issue Jun. 15, 1993 to Kravitz, as is U.S. Pat. No. 5,228,606 issued Jul. 20, 1993 to Hickson.

SUMMARY OF THE INVENTION

The invention is directed to an arrangement for carrying bicycles or motorcycles that will provide ease in securing the cycle while transporting or storing and in addition function independently or in combination with similar devices or a series of similar devices.

The invention is characterized by a novel channel adapted to receive the wheel consisting of the tire and rim and, by passing a blocking member through the walls of the channel between the inner dimension of the rim and the axle prevent removal of the wheel.

The channel exists in two forms, in one aspect the channel is constructed from rolled steel and a steel plate. The rolled steel is bent forming a wall of the channel and exists in the shape of a truncated triangle with the ends of the rolled portion affixed to the plate. The opposed wall of the channel is formed in the same manner. The walls are inclined to the end plate, the walls being closer at the end plate than at the distal end dimension. A series of throughgoing apertures are contained in corresponding positions in each wall, thereby allowing a blocking pin to pass through and restrain a wheel, located in the channel from being removed. The blocking pin may be suitably secured to prevent removal by unauthorized persons.

In the other aspect the channel is formed of a single piece of deep channel steel. The walls of the channel are flared gently and through going apertures accept a flat bar for locking the wheel in the channel. The bar is tapered with a series of holes for accepting a locking means. The taper to the bar allows wheels of different sizes to be secured.

The invention in either form may be attached to the front wall of a pickup truck or to the track of a roof top bicycle carrier. There is really no limit on the locations where the invention may be utilized.

It is therefore an object of the invention to provide a new and improved apparatus for securing bicycles and motorcycles.

It is another object of the invention to provide a new and improved apparatus for securing cycles of all types that is convenient and easy to use.

It is a further object of the invention to provide a new and improved apparatus for securing cycles of all types .that is an improvement over any similar hitherto known device.

It is still another object of the invention to provide a new and improved apparatus for securing cycles of all types which is of a durable and reliable construction.

It is still a further object of the invention to provide a new and improved apparatus for securing cycles of all types which may be easily and efficiently manufactured and marketed.

It is another object of the invention to provide a new and improved apparatus for securing cycles of all types that is low in cost to the consuming public.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a detailed view of the invention.

FIG. 4 is a detailed view of another embodiment of the invention.

FIG. 5 is an environmental view of the invention.

FIG. 6 is a top plan view of the invention.

DETAILED DESCRIPTION OF THE PREFERRED EMBODIMENTS

Figure 1:
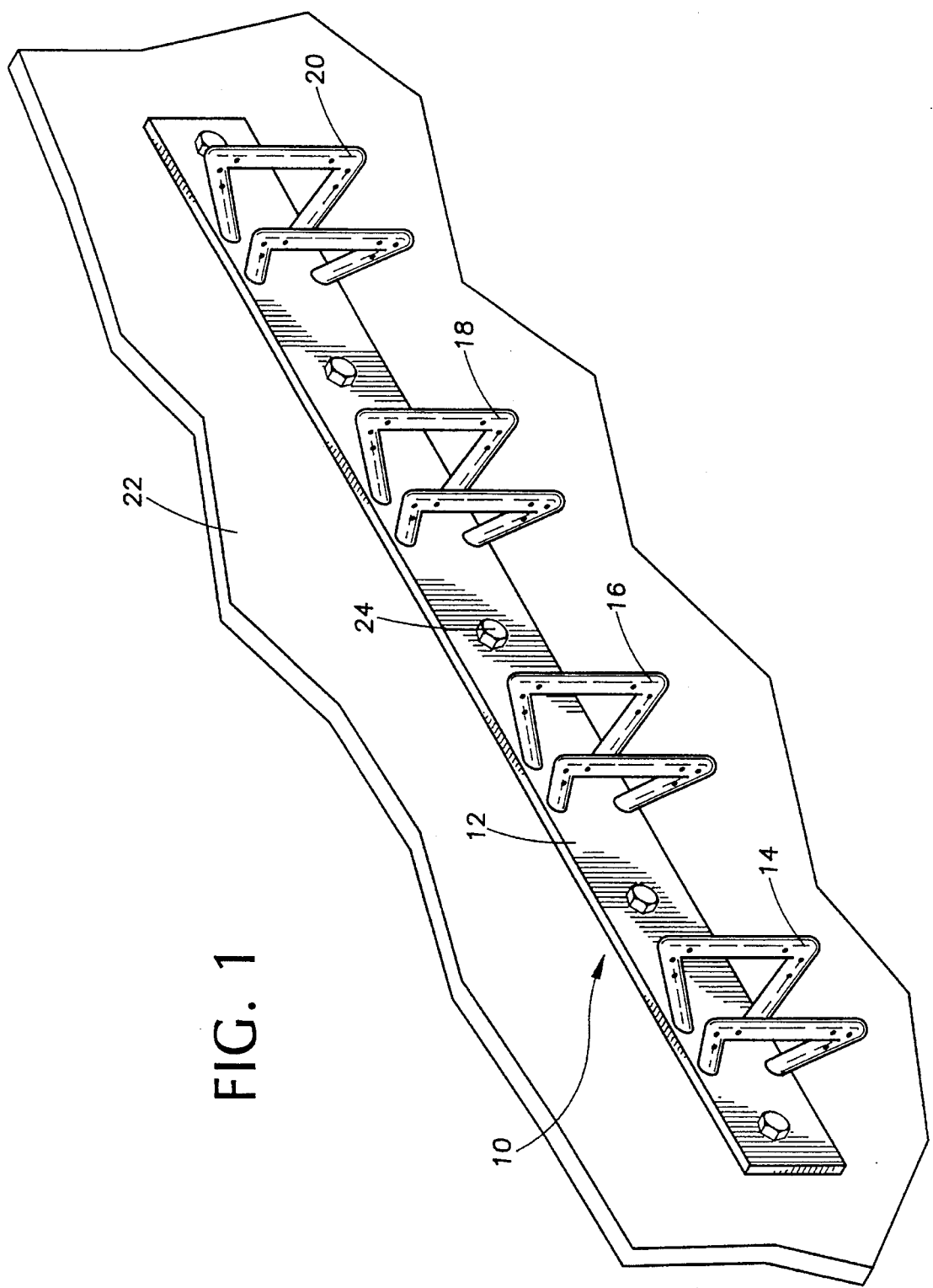
FIG. 1 is a perspective view of one embodiment of the invention.

Referring now to FIG. 1, the invention is shown generally at 10 mounted on a plate 12 of steel or other suitable material with other similar wheel locks 14,16,18,20. The invention is capable of use singly or in multiple units as shown. Similarly the plate 12 may be mounted on a horizontal surface as in the bed of a truck or on the floor in a building for example. As shown, the plate is mounted on a vertical surface such as the front panel of a pickup truck or a wall inside or out side a building. The invention is formed from substantial materials and the plate could be attached to a ceiling and bicycles suspended from the ceiling of a location. The plate would be attached to a surface as by bolts 24.

Figure 2:
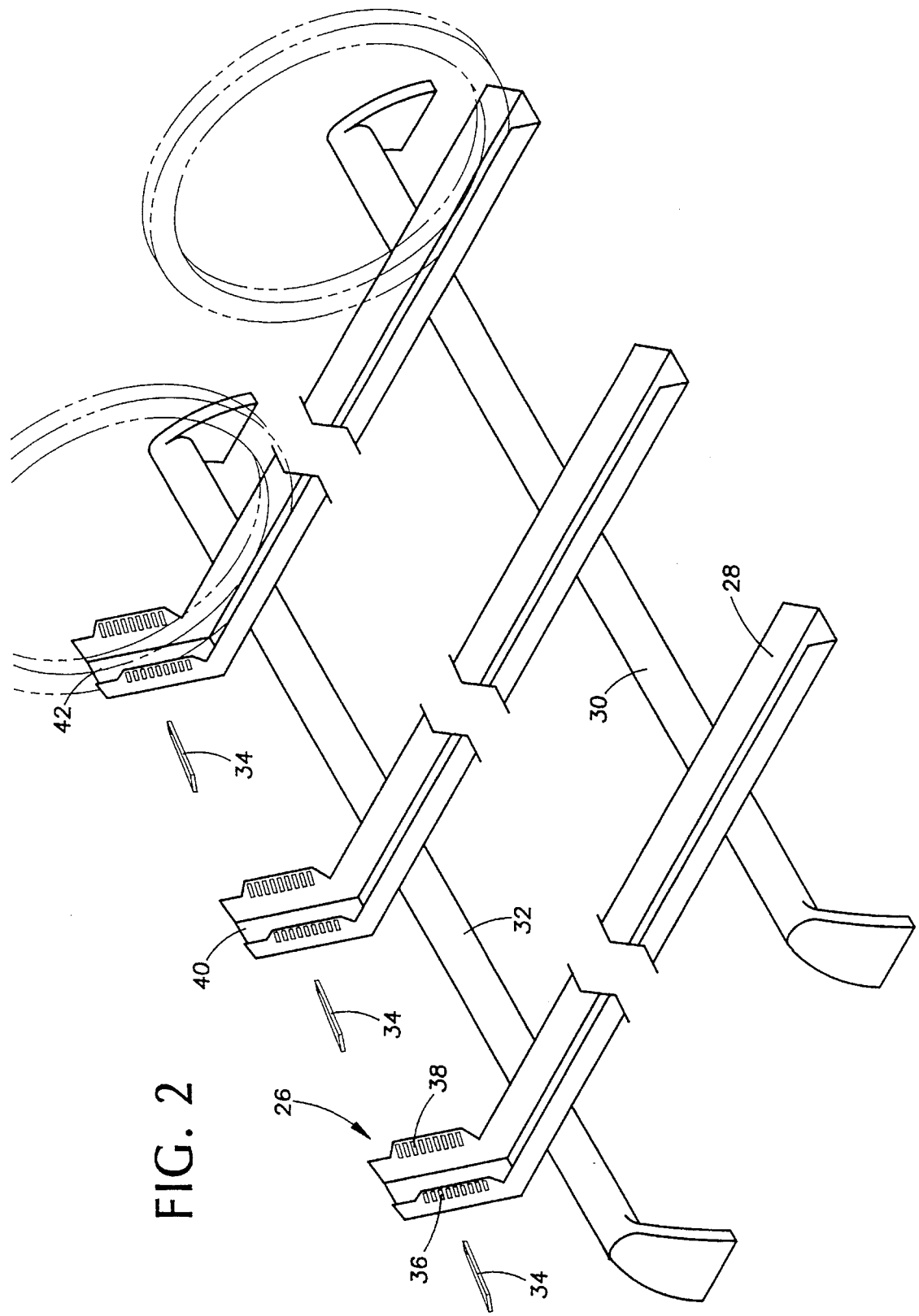
FIG. 2 is a perspective view of another embodiment of the invention.

In FIG. 2, the invention is shown generally at 26 in another embodiment. Utilized at the end of a channel 28 formed as part of an automotive roof rack with cross members 30, 32 the front wheel of a bicycle is locked in place by the tapered bar 34 sliding through one of the pair of grooves 36,38. The roof rack embodiment may also be used alone or in combination with other cycle locks as shown in the figure as 40,42.

Concerning FIGS. 3 and 4 the invention is shown in detail. In FIG. 3 a channel is formed with walls 44 and 46. The mounting plate 12 forms the last side of the channel. Walls 44 and 46 are in the form of a truncated triangle with the deleted apex replaced with the plate 12. The walls are inclined away from each other being closest at the plate 12 and most distant at the distal edge 48 and 50. The walls are formed of rolled steel and attached to the plate in a convenient and conventional manner as by welding. Each wall contains a plurality of through going apertures arranged in clusters 52,54. The apertures are arranged so pins 56,58 will cooperate between the side walls and lock a wheel in the channel in place. Pins 56,58 include distal transverse through going apertures 60, 62 for receiving locking means shown as pins 64,66. Conventional pad locks could be substituted for the pins dependent upon the particular application of the invention. FIG. 4 shows the invention 26 with the channel formed of fiat plate, preferably steel although other materials will work equally as well. The base of the channel 68 may be attached as by welding to a mounting plate 12 or a longitudinal channel as shown in FIG. 2. The walls 70,72 of the channel diverge in a manner similar to the embodiment shown in FIG. 3, that is closer at the base of the channel and spaced farther apart at the distal edge. Cooperating slots 36,38 accept bar 34 and lock a wheel in the channel in the manner described. Holes in the bar are for a locking mechanism 76 which may be a pin or a pad lock style lock. The cooperating holes and slots are arranged to allow for a variety in the size wheels the lock will accept, amounting to a novel adjustment feature.

FIG. 5 shows a bicycle wheel consisting of a tire 78 mounted on a rim 80 held by pins 56,58 passing over the rim and engaging side wall 44 by means of apertures 52,54. The pin 58 is shown to be secured by pad lock 82.

Figure 7:
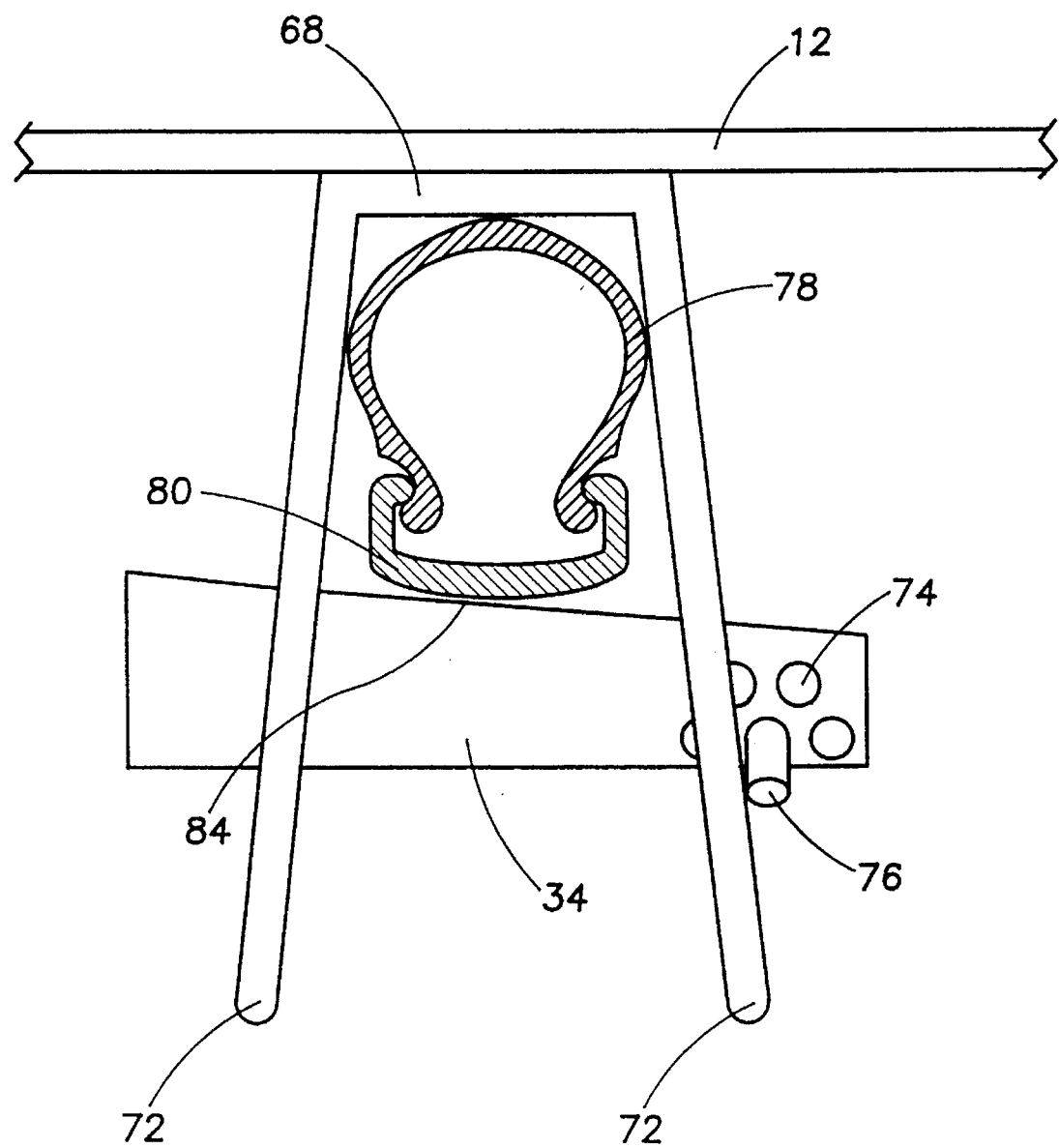
FIG. 7 is a top plan view of another embodiment of the invention.

In FIG. 6, the tire 78 is shown to be of a size larger than the channel will accept, at least to the base. The adjustable feature of the invention will allow the pin 56 to be moved to a hole 52 in the side wall that will allow the wheel to be secured as desired. FIG. 7 shows the side walls 70,72 engaging the wheel 78,80 which rests on the bottom of the channel 68. The bar 34 is tapered on the side 84 adjacent the rim 80 allowing the bar to securely engage the rim of the wheel and then be locked in place using one of the holes 74 and a pin or lock 76.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A wheel securing rack for cycles comprising:

a channel having a base including a primary longitudinal axis;

said channel further comprising a pair of spaced apart side walls affixed to the base, parallel to the primary axis; means affixed to the base for mounting the channel;

the spaced apart side walls are inclined to the primary axis by being closer to each other at the base than away from the base;

the side walls each include cooperating slots; and locking means, connecting the side walls for locking a wheel in the channel, comprising:

a flat bar for connecting the side walls through said cooperating slots, said flat bar comprising a first end a second end and a length therebetween, the sides along the length of said flat bar converging from said second end to said first end such that the width of said second end is greater than the width of said first end wherein one of said sides is adapted to engage a wheel in said channel when said flat bar connects said side walls;

said first end of said flat bar includes a plurality of throughgoing locking pin apertures; and a locking pin removably placed in at least one of the locking pin apertures.

2. A wheel securing rack for cycles according to claim 1 wherein the side walls are formed of flat steel plate material.

3. A wheel securing rack for cycles according to claim 1 wherein the channel is removably mounted on a surface.

4. A wheel securing rack for cycles according to claim 3 wherein the surface is a vehicle roof rack.

5. A wheel securing rack for cycles according to claim 1 wherein the locking means is removably inserted through said cooperating slots.

6. A wheel securing rack for cycles according to claim 3 wherein the surface is a wall of a vehicle.

* * * * *